United States Patent
Park et al.

(10) Patent No.: US 9,426,832 B2
(45) Date of Patent: Aug. 23, 2016

(54) METHODS AND ARRANGEMENTS TO COORDINATE COMMUNICATIONS IN A WIRELESS NETWORK

(71) Applicant: Intel Corporation, Santa Clara, CA (US)

(72) Inventors: Minyoung Park, Portland, OR (US); Adrian P. Stephens, Cambridge (GB); Thomas A. Tetzlaff, Hillsboro, OR (US); Emily H. Qi, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/730,992

(22) Filed: Dec. 29, 2012

(65) Prior Publication Data

US 2013/0279382 A1    Oct. 24, 2013

Related U.S. Application Data

(60) Provisional application No. 61/637,626, filed on Apr. 24, 2012.

(51) Int. Cl.
*G08C 17/00* (2006.01)
*H04W 74/08* (2009.01)

(52) U.S. Cl.
CPC ....... *H04W 74/085* (2013.01); *H04W 74/0891* (2013.01)

(58) Field of Classification Search
CPC .................................................. H04W 74/085
USPC ................................................ 370/311, 377
See application file for complete search history.

(56) References Cited

U.S. PATENT DOCUMENTS

| 7,787,401 | B2 | 8/2010 | Kinder |
| 2004/0228282 | A1 | 11/2004 | Bao et al. |
| 2005/0068928 | A1 | 3/2005 | Smith et al. |

(Continued)

FOREIGN PATENT DOCUMENTS

| JP | 2006-526364 A | 11/2006 |
| JP | 2007-507982 A | 3/2007 |

(Continued)

OTHER PUBLICATIONS

International Search Report received for PCT Patent Application No. PCT/US2013/037163, mailed Jul. 23, 2013, 3 pages.

(Continued)

*Primary Examiner* — Wei Zhao
(74) *Attorney, Agent, or Firm* — Schubert Law Group PLLC

(57) ABSTRACT

Logic to coordinate communications of wireless communications devices to attenuate collisions, such as through coordination of communications by implementing slot logic in an access point. The slot logic may determine a time slot schedule for beacon intervals and may further transmit a synch frame at the time slot boundaries. If the channel is busy, the slot logic may not send the synch frame. The slot logic may also comprise distribution logic to determine a probability of collisions and to instruct one or more of the devices to spread out their channel accesses across beacons intervals to reduce the chance of collisions. A station associated with the access point may comprise synch logic to wake up at a slot boundary and wait for a synch frame or any other packets to synch to the medium.

30 Claims, 7 Drawing Sheets

(56) References Cited

U.S. PATENT DOCUMENTS

| | | |
|---|---|---|
| 2005/0071517 A1 | 3/2005 | O'Mahony |
| 2005/0128988 A1 | 6/2005 | Simpson |
| 2006/0285507 A1 | 12/2006 | Kinder et al. |
| 2008/0151848 A1 | 6/2008 | Fischer |
| 2008/0310390 A1* | 12/2008 | Pun et al. ............ 370/347 |
| 2009/0080454 A1* | 3/2009 | Koyanagi ............ 370/445 |
| 2009/0103501 A1* | 4/2009 | Farrag et al. ............ 370/337 |
| 2009/0238133 A1 | 9/2009 | Sakoda |
| 2010/0296493 A1* | 11/2010 | Lee et al. ............ 370/336 |

FOREIGN PATENT DOCUMENTS

| | | |
|---|---|---|
| JP | 2009-260925 A | 11/2009 |
| KR | 2009/0100273 A | 9/2009 |
| KR | 2010-0053428 A | 5/2010 |
| WO | 2013/162998 A1 | 10/2013 |

OTHER PUBLICATIONS

Written Opinion of the International Search Authority received for PCT Patent Application No. PCT/US2013/037163, mailed on Jul. 23, 2013, 6 pages.

(IB/373) International Preliminary Report on Patentability Chapter 1 for PCT Patent Application No. PCT/US2013/037163, mailed Oct. 28, 2014, 7 pages.

Extended Search Report received for European Patent Application No. 13782274.8, mailed Aug. 5, 2015, 7 pages.

Office Action received for Korean Patent application No. 2014-7027032, mailed on Aug. 20, 2015, 6 pages of English Translation and 7 pages of Korean Office Action.

Office Action received for Japanese Patent Application No. 2015-500683, mailed on Oct. 20, 2015, 3 pages of English Translation.

* cited by examiner

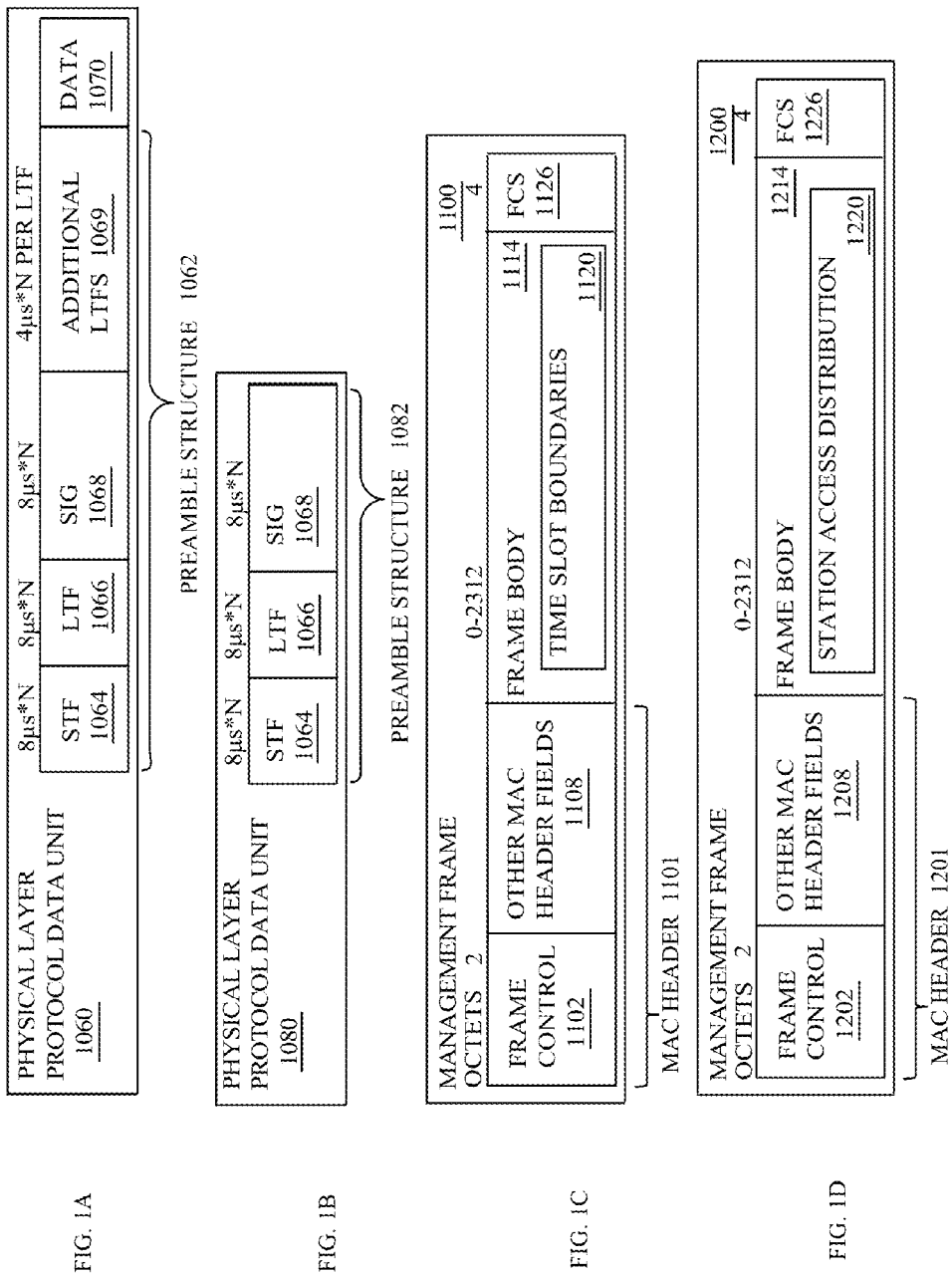

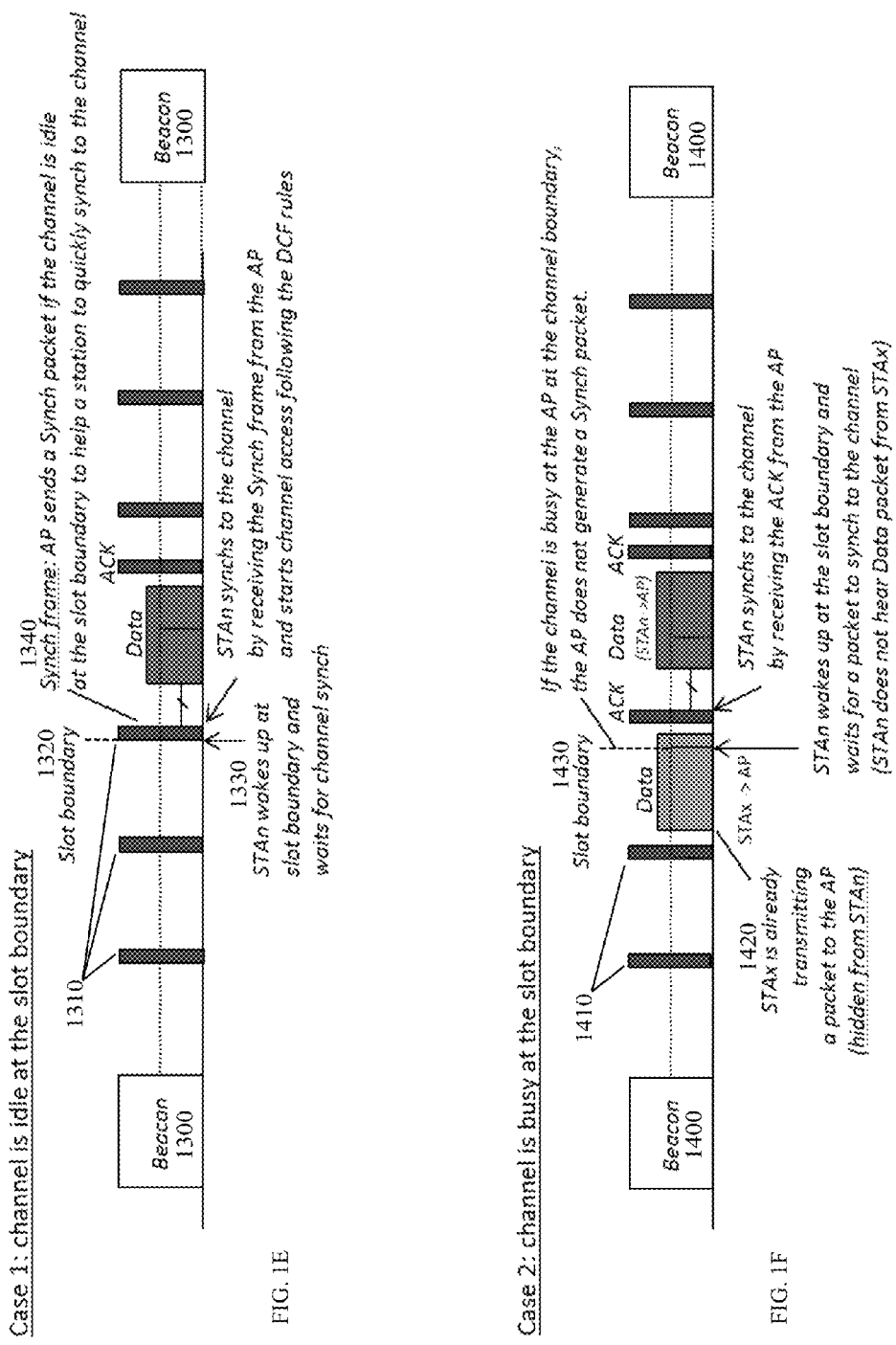

METHODS AND ARRANGEMENTS TO COORDINATE COMMUNICATIONS IN A WIRELESS NETWORK

BACKGROUND

The present disclosure relates generally to the field of wireless communications technologies. More particularly, the present disclosure relates to establishing times during beacon intervals at which devices on a wireless network can awake from a doze state and synch with a channel.

BRIEF DESCRIPTION OF THE DRAWINGS

FIG. 1A depicts an embodiment of a synch frame for establishing communications between wireless communication devices;

FIG. 1B depicts an alternative embodiment of a synch frame with no data payload for establishing communications between wireless communication devices;

FIG. 1C depicts an embodiment of a management frame with time slot boundaries for beacon frame intervals;

FIG. 1D depicts an embodiment of a management frame with station access distribution information for establishing communications between wireless communication devices;

FIG. 1E depicts an embodiment of a beacon interval with time slot boundaries for the system illustrated in FIG. 1;

FIG. 1F depicts an alternative embodiment of a beacon interval with time slot boundaries for the system illustrated in FIG. 1;

DETAILED DESCRIPTION OF EMBODIMENTS

Figure 1:
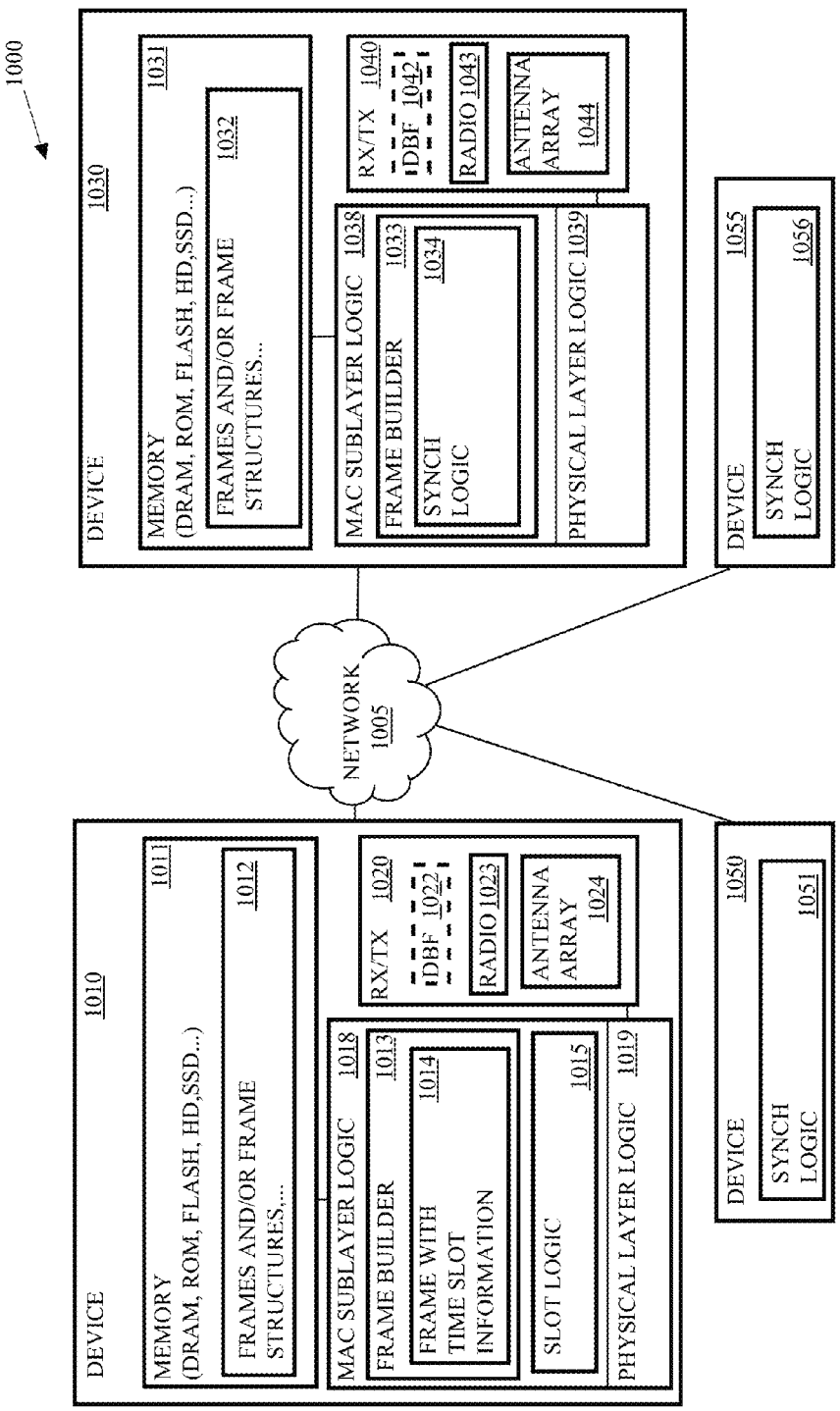
FIG. 1 depicts an embodiment of a wireless network comprising a plurality of communications devices.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives as defined by the appended claims. The detailed descriptions below are designed to make such embodiments understandable and obvious to a person having ordinary skill in the art.

Generally, embodiments for coordinating communications of devices on a network are described herein. Embodiments may comprise logic such as hardware and/or code to coordinate communications of wireless communications devices to attenuate collisions. Many embodiments coordinate communications by implementing slot logic in an access point. The slot logic may determine a time slot schedule for beacon intervals. In many embodiments, the slot logic sends a short synch frame such as a no data payload frame at each time slot boundary if the channel is idle at the time slot boundary. In several embodiments, if the channel is busy, the slot logic does not send the synch frame.

In some embodiments, the slot logic may also comprise distribution logic to determine a significant probability of collisions between one or more devices and to instruct one or more of the devices to spread out their channel accesses across beacons intervals to reduce the chance of collisions.

In further embodiments, a station associated with the access point may comprise synch logic to wake up at a slot boundary and wait for a synch frame or any other packets to synch to the medium. Such embodiments may to minimize the medium synch time for the station because the station may synch with the channel in response to receipt of the synch frame. In many embodiments, the station may remain in a doze state before the slot boundary and wake from the doze state in an awake state to minimize power consumption.

In some embodiments, the slot logic may comprise slot selection logic to receive and interpret a distribution for station accesses for a channel that indicates that the station should use a particular or a different time slot when accessing the channel. If there is a significant probability of collisions between the stations on the channel, which, e.g., wake up at the same slot boundary, the access point may instruct the stations' to spread their channel accesses over a beacon interval to minimize the chance of collisions. The slot selection logic may interpret the instruction to use a particular or a different time slot and determine a corresponding time slot. Thereafter, the station may wake up and receive a synch frame (which means the channel is idle at the access point side) from the access point. The station may then start to access the channel after a distributed coordination function interframe space (DIFS) or an arbitration interframe space (AIFS) and backoff and send a packet. Since the station is synchronized to the synch frame sent by the access point, the station can determine that there is no other data reception at the access point and can safely send a packet to the access point. This process may minimize the station's channel synch time. For instance, the channel synch time may be the time the station spent to receive the synch frame.

On the other hand, if the station wakes up at the slot boundary and does not detect a synch frame, which means the channel may be busy at the access point side, the station may wait for a packet to synch to the channel. This process may prevent potential collisions at the access point side.

Various embodiments may be designed to address different technical problems associated with coordinating communications of devices. For instance, some embodiments may be designed to address one or more technical problems such as synching a station with a channel. The technical problem of synching a station with a channel may involve informing the station whether the access point is communicating with another station.

Different technical problems such as those discussed above may be addressed by one or more different embodiments. For instance, some embodiments that are designed to address synching a station with a channel may do so by one or more different technical means such as establishing time slots between beacon frame transmissions. Further embodiments that are designed to inform the station whether the access point is communicating with another station may do so by one or more different technical means such as transmitting a synch frame at the corresponding slot boundaries. Further embodiments that may establish time slots within beacon intervals based upon other available information may do so by one or more different technical means such as instructing stations to spread out accesses of the channel across more than one time slots.

Some embodiments implement a one Megahertz (MHz) channel bandwidth for Institute of Electrical and Electronic Engineers (IEEE) 802.11ah systems. The lowest data rate in such embodiments may be approximately 6.5 Megabits per second (Mbps) divided by 20=325 Kilobits per second (Kbps). If two times repetition coding is used, the lowest data rate drops to 162.5 Kbps. In many embodiments, the lowest PHY rate is used for beacon and control frame transmissions. Although lowering the data rate may increase the transmission range, it takes much longer time to transmit a packet. According to one embodiment, the efficiency of the protocol may enable small battery-powered wireless devices (e.g., sensors) to use Wi-Fi to connect to the, e.g., Internet with very low power consumption.

Some embodiments may take advantage of Wireless Fidelity (Wi-Fi) network ubiquity, enabling new applications that often require very low power consumption, among other unique characteristics. Wi-Fi generally refers to devices that implement the IEEE 802.11-2007, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2007.pdf) and other related wireless standards.

Several embodiments comprise access points (APs) for and/or client devices of APs or other stations (STAs) such as cellular off-loading devices, routers, switches, servers, workstations, netbooks, mobile devices (Laptop, Smart Phone, Tablet, and the like), as well as sensors, meters, controls, instruments, monitors, appliances, and the like. Some embodiments may provide, e.g., indoor and/or outdoor "smart" grid and sensor services. For example, some embodiments may provide a metering station to collect data from sensors that meter the usage of electricity, water, gas, and/or other utilities for a home or homes within a particular area and wirelessly transmit the usage of these services to a meter substation. Further embodiments may collect data from sensors for home healthcare, clinics, or hospitals for monitoring healthcare related events and vital signs for patients such as fall detection, pill bottle monitoring, weight monitoring, sleep apnea, blood sugar levels, heart rhythms, and the like. Embodiments designed for such services generally require much lower data rates and much lower (ultra low) power consumption than devices provided in IEEE 802.11n/ac systems.

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise an access point. The communications devices 1030, 1050, and 1055 may comprise low power communications devices such as sensors, consumer electronics devices, personal mobile devices, or the like. For example, the communications device 1010 may comprise a metering substation for water consumption within a neighborhood of homes. Each of the homes within the neighborhood may comprise a sensor such as the communications devices 1030, 1050, and 1055 and the communications devices 1030, 1050, and 1055 may be integrated with or coupled to water meter usage meters.

In some embodiments, the communications device 1010 may comprise slot logic 1015 to determine time slots for beacon intervals and to transmit the time slots to devices such as the communications devices 1030, 1050, and 1055, which are associated with the communications device 1010 or that request association with the communications device 1010. The time slots may comprise time slot boundaries and may have lengths of time of at least a transmission time for a maximum physical layer convergence procedure protocol data unit (PPDU) transmission from a station, a short interframe space (SIFS), and an acknowledgement (ACK) transmission from an access point. In further embodiments, the time slots may have boundaries with a time duration for a transmission of at least a PPDU transmission such as an average or mean PPDU transmission on the network or a maximum PPDU transmission on the network plus a SIFS. And, in still other embodiments, the time slots may be a time duration for a transmission of at least a PPDU transmission or less than a PPDU transmission. In many embodiments, the slot logic 1015 may store the time slot information in memory 1011.

In some embodiments, the slot logic 1015 may instruct a physical layer logic 1019 to transmit the time slot information such as time slot boundaries in one or more beacon frame 1014 transmissions to all devices associated with the communications device 1010. In further embodiments, the slot logic 1015 may also transmit synch frames at the time slot boundaries between beacon frame 1014 transmissions for each time slot boundary at which the channel is idle or at which the communications device 1010 (the AP) is not communicating with one of the stations (STAs) such as the communications devices 1030, 1050, and 1055. For instance, the communications device 1010 may follow distributed coordination function (DCF) rules. The fundamental access method of the IEEE 802.11 medium access control (MAC) is a DCF known as carrier sense multiple access with collision avoidance (CSMA/CA). The DCF may be implemented in all STAs including the AP, for use within both independent basic service set (IBSS) and infrastructure network configurations. To follow the DCF rules, the communications device 1010 may sense the channel (or medium) to determine if another STA is transmitting. If the channel is not determined to be busy, the transmission may proceed. The CSMA/CA distributed algorithm may mandate that a gap of a minimum specified duration exist between contiguous frame sequences so the communications device 1010 may ensure that the channel is idle for this required duration before attempting to transmit the synch frame.

The synch frames may be frames that indicate or are interpreted as an indication that the channel is currently idle and may include training sequences to synch a station to the channel. In several embodiments, the synch frames may comprise physical layer (PHY) frames that do not include a MAC sublayer frame as a payload. For instance, MAC sublayer logic 1018 of the communications device 1010 may instruct the PHY logic 1019 to transmit a synch frame but the MAC sublayer logic 1018 may not provide a MAC frame to include in the packet.

In many embodiments, the no payload data synch frame may comprise six orthogonal frequency division multiplexing (OFDM) symbols. For instance, if the slot size is approximately 20 milliseconds in length, the length of the synch frame may be six symbols times the length of the symbol, e.g., 40 microseconds, for a total of, e.g., 240 microseconds. Such embodiments may add, e.g., 1.2 percent in overhead to communications traffic for transmission of the synch frames at the time slot boundaries. In other embodiments, the synch frames may comprise more or less symbols and, in several of such embodiments, the synch frame may comprise a MAC protocol data unit (MPDU) as a payload.

A station such as the communications device 1030 may determine to wake from a low power consumption state to transmit data to the communications device 1010. In several embodiments, stations such as the communications devices 1030, 1050, and 1055 may comprise slot logic 1034, 1051, and 1056, respectively, to determine to wake from a doze state to an awake state at a time slot boundary, receive a synch frame to synch with the channel, and transmit the packet to the communications device 1010 after synching with the channel. In several embodiments, the communications device 1030 may synch with the channel upon receipt of the synch frame because the transmission of the synch frame indicates that the channel is idle.

In some situations, slot logic of more than one of the stations associated with the access point may determine to wake at the same time slot boundary to transmit a packet to the access point. In many embodiments, the access point such as the communications device 1010 may comprise distribution logic to determine a significant probability of communication collisions associated with one or more of the stations and to instruct the stations to spread out channel accesses to mitigate the occurrence of collisions. For instance, the communications device 1010 may determine that a significant probability of collisions if a collision is detected, if more than one collision is detected, if more than one collision is detected within a predetermined period of time, if more than one collision is associated with communications by the same station, if the collisions have more than a five percent probability of occurring, if the collisions have more than a ten percent probability of occurring, if the collisions have more than a 50 percent probability of occurring, if the collisions have more than a 75 percent probability of occurring, if a large percentage of the stations select the same time slot for transmissions, and/or the like.

After determining a significant probability of occurrence of collisions, the distribution logic may determine a station access distribution to spread out the accesses by the stations associated with the communications device 1010. In some embodiments, the station access distribution may affect communications by the one or more stations associated with a significant probability of collision. In further embodiments, the station access distribution may affect communications by all of the stations associated with the communications device 1010. In some embodiments, the distribution logic may assign each of the associated stations to a particular time slot based upon probabilities of or detection of collisions and may update assignments if further collisions occur after an original assignment. For instance, after generating a station access distribution to spread out the accesses by the stations associated with the communications device 1010, the distribution logic of the communications device 1010 may detect a collision or determine a significant probability of a collision between a particular station and one or more other stations. In response, the distribution logic may determine a new or updated assignment to a different time slot for the particular station and transmit the updated station access distribution to the stations in one or more subsequent frames.

If the communications device 1030 wakes up and receives a synch frame (which means the channel is idle at the AP side) from the communications device 1010, the communications device 1030 starts to access the channel by starting with DIFS (or AIFS) and then a backoff. The communications device 1010 may thereafter transmit a packet. Since the communications device 1030 is synchronized to the synch frame sent by the communications device 1010, the communications device 1030 may determine that there is no other data reception at the communications device 1010. Thus, the communications device 1030 can safely send a packet to the communications device 1010, minimizing the synch time for accessing the channel.

On the other hand, if the communications device 1030 wakes up at the slot boundary and does not receive a synch frame, the channel may be busy at the communications device 1010 side, so the communications device 1030 may wait for a packet to synch to the channel for a ProbeDelay time to prevent or mitigate a possible collision at the communications device 1010 side.

In many embodiments, the communications device 1010 may facilitate data offloading. For example, communications devices that are low power sensors may include a data offloading scheme to, e.g., communicate via Wi-Fi, another communications device, a cellular network, or the like for the purposes of reducing power consumption consumed in waiting for access to, e.g., a metering station and/or increasing availability of bandwidth. Communications devices that receive data from sensors such as metering stations may include a data offloading scheme to, e.g., communicate via Wi-Fi, another communications device, a cellular network, or the like for the purposes of reducing congestion of the network 1005.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, network 1005 communicatively couples communications devices 1010, 1030, 1050, and 1055.

The communication devices 1010 and 1030 comprise memory 1011 and 1031, and MAC sublayer logic 1018 and 1038, respectively. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may store the frames such as the management frames, and/or the frame structures. In many embodiments, memory 1011 and 1031 may store management frames such as beacon frames, association request frames, and association response frames, which may comprise fields based upon the structure of the standard frame structures identified in IEEE 802.11.

FIG. 1A depicts an embodiment of a physical layer protocol data unit (PPDU) 1060 of a synch frame with a preamble structure 1062 for establishing communications between wireless communication devices such as communications devices 1010, 1030, 1050, and 1055 in FIG. 1. The PPDU 1060 may comprise a preamble structure 1062 including orthogonal frequency division multiplexing (OFDM) training symbols for a single multiple input, multiple output (MIMO) stream followed by a signal field, followed by additional OFDM training symbols for additional MIMO streams, and the preamble structure 1060 may be followed by the data payload. In particular, the PPDU 1060 may comprise a short training field (STF) 1064, a long training field (LTF) 1066, the SIG 1068, additional LTFs 1069, and data 1070. The STF 1064 may comprise a number of short training symbols such as 10 short training symbols that are 0.8 microseconds (μs) times N in length, wherein N is an integer representing the down-clocking factor from a 20 MHz channel spacing. For instance, the timing would double for 10 MHz channel spacing. The total time frame for the STF 1064 at a 20 MHz channel spacing is 8 μs times N.

The LTF 1066 may comprise a guard interval (GI) symbol and two long training symbols. The guard interval symbol may have a duration of 1.6 μs times N and each of the long training symbols may have durations of 3.2 μs times N at the 20 MHz channel spacing. The total time frame for the LTF 1066 at a 20 MHz channel spacing is 8 μs times N.

The SIG 1068 may comprise a GI symbol at 0.8 μs times N and signal field symbols at 7.2 μs times N. In the present embodiment, the synch frame also comprises the additional LTFs 1069. The additional LTFs 1069 may comprise one or more LTF symbols for additional MIMO streams if needed at 4 μs times N at 20 MHz channel spacing. The data 1070 may comprise one or more MAC sublayer protocol data units (MPDUs) and may include one or more GIs. For example, data 1070 may comprise one or more sets of symbols including a GI symbol at 0.8 μs times N at the 20 MHz channel spacing followed by payload data at 3.2 μs times N at the 20 MHz channel spacing.

FIG. 1B depicts an alternative embodiment of a physical layer protocol data unit (PPDU) 1080 of a synch frame with no data payload (NDP) with a preamble structure 1082 for establishing communications between wireless communication devices such as communications devices 1010, 1030, 1050, and 1055 in FIG. 1. The PPDU 1080 may comprise a preamble structure 1082 including orthogonal frequency division multiplexing (OFDM) training symbols for a single multiple input, and multiple output (MIMO) stream followed by a signal field. In particular, the PPDU 1080 may comprise a short training field (STF) 1064, a long training field (LTF) 1066, and the SIG 1068.

FIG. 1C depicts an embodiment of a management frame 1100 for communications between wireless communication devices such as communications devices 1010, 1030, 1050, and 1055 in FIG. 1. The management frame 1100 may comprise a MAC header 1101, a frame body 1114, and a frame check sequence (FCS) field 1126. The MAC header 1101 may comprise the frame control field 1102 and other MAC header fields 1108. The frame control field 1102 may be two octets and may identify the type and subtype of the frame such as a management type and, e.g., a beacon frame subtype. The other MAC header fields 1108 may comprise, for example, one or more address fields, identification fields, control fields, or the like.

In some embodiments, the management frame 1100 may comprise a frame body 1114. The frame body 1114 may be a variable number of octets and may include data elements, control elements, or parameters and capabilities. In the present embodiment, the frame body 1114 comprises a time slot boundaries field 1120. The time slot boundaries field 1120 may comprise an indication of one or more time slots for a beacon interval for devices to access the channel and to be synchronized to the channel.

FIG. 1D depicts an embodiment of a management frame 1200 for communications between wireless communication devices such as communications devices 1010, 1030, 1050, and 1055 in FIG. 1. The management frame 1200 may comprise a MAC header 1201, a frame body 1214, and a frame check sequence (FCS) field 1226. The MAC header 1201 may comprise the frame control field 1202 and other MAC header fields 1208. The frame control field 1202 may be two octets and may identify the type and subtype of the frame such as a management type and, e.g., a beacon frame subtype. The other MAC header fields 1208 may comprise, for example, one or more address fields, identification fields, control fields, or the like.

In some embodiments, the management frame 1200 may comprise a frame body 1214. The frame body 1214 may be a variable number of octets and may include data elements, control elements, or parameters and capabilities. In the present embodiment, the frame body 1214 comprises a station access distribution field 1220. The station access distribution field 1220 may comprise an indication of a distribution of assignments of one or more stations across the time slots between beacon frame intervals on the channel. In some embodiments, a time slot boundaries field such as the time slot boundaries field 1120 may also be included in the frame body 1214.

FIG. 1E illustrates an embodiment of a beacon 1300 interval with time slot boundaries 1310 such as the time slot boundaries indicated in FIG. 1C for the system illustrated in FIG. 1. The beacon 1300 interval may comprise the time duration between the beacons 1300. During the beacon 1300 interval the access point such as communications device 1010 may transmit synch frames 1310 at each slot boundary during which the channel is idle.

In the present embodiment, a station associated with the AP wakes 1330 from a doze state to an awake state at the time slot boundary 1320 to receive the synch frame 1340 from the communications device 1010. The station may follow the distributed coordination function (DCF) rules after waking at the slot boundary by starting to access the channel with a distributed (coordination function) interframe space (DIFS), or an arbitration interframe space (AIFS), and a backoff such as a random backoff. Thereafter, the station may transmit the data and the access point such as communications device 1010 may respond to receipt of the data with an acknowledgement (ACK).

FIG. 1F depicts an embodiment of a beacon 1400 interval with time slot boundaries 1410 for the system illustrated in FIG. 1. At the second slot boundary, a station X begins to access the channel in accordance with DCF rules. The station X may start with a DIFS and backoff prior to transmitting the data. The data transmission continues passed the subsequent slot boundary 1430 so the channel is busy at the subsequent slot boundary 1430 and the AP does not generate or transmit a synch frame at the slot boundary

1430. Station N wakes to receive the synch frame at the slot boundary 1430 but does not receive a synch frame so the station N waits to receive another packet to synch to the channel, which is the acknowledgement (ACK) transmitted by the AP to the station X to acknowledge receipt of the data.

After the AP transmits an acknowledgement, the station N synchs with the channel based upon the network allocation vector (NAV) in the ACK transmitted from the AP. The station N then begins to transmit data to the AP and receives an ACK prior to the subsequent time slot boundary.

Figure 1H:
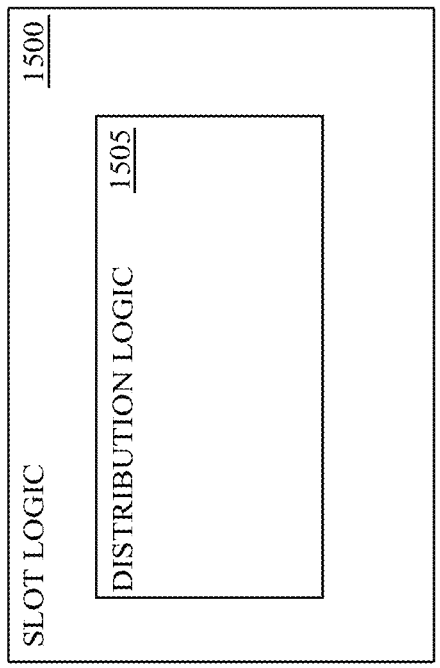
FIG. 1H depicts an embodiment of synch logic for stations associated with the access point in the system illustrated in FIG. 1.
Figure 1G:
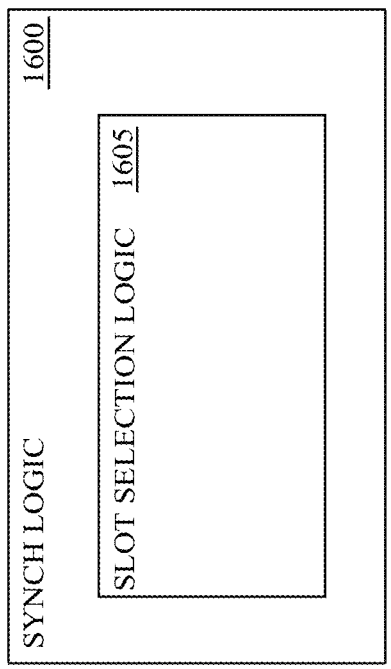
FIG. 1G depicts an embodiment of slot logic for an access point in the system illustrated in FIG. 1.

FIG. 1G illustrates an embodiment of slot logic 1500 such as the slot logic 1015 illustrated in FIG. 1. The slot logic 1500 may determine a time slot schedule that divides beacon intervals into time slots. In many embodiments, the slot logic 1500 may determine each time slot to be a time duration of at least a duration for transmission of a physical layer convergence procedure protocol data unit (PPDU) plus a short interframe space (SIFS) plus a duration for transmission of an acknowledgement (ACK) frame. In some embodiments, the slot logic 1500 may determine each time slot to be a time duration of at least a duration for transmission of a PPDU plus a SIFS. In some embodiments, the time duration for transmission of the PPDU may be a maximum transmission duration for a PPDU in the basic service set (BSS) and, in other embodiments, the time duration for transmission of the PPDU may be a mean or average transmission duration for a PPDU in the BSS.

The slot logic 1500 may comprise distribution logic 1505 to determine a significant probability of collisions between two or more communications device; determine a distribution of accesses by the two or more communications devices; generate a frame indicating the distribution of accesses; and instruct the physical layer logic transmit the frame to the two or more communications devices such as the communications devices 1030, 1050, and 1055. For instance, the distribution logic 1505 may detect a collision with a communication from a device in the BSS. In some embodiments, the distribution logic 1505 may determine that the collision indicates a significant probability of collisions. In further embodiments, more than one collision or more than one collision associated with the same device may represent a significant probability of collisions.

In some embodiments, the distribution logic 1505 may determine a significant probability of collisions without necessarily detecting a collision. For instance, the distribution logic 1505 may determine factors such as the number of devices, types of devices, the relative strengths of signals received from devices, the amount of traffic on the channel, the amount of non-periodic traffic, the amount of periodic traffic, and the like. Based upon one or more or all of these factors, the distribution logic 1505 may calculate a probability of a collision. In several embodiments, if the probability of collisions is not insignificant then the probability may be considered significant. In some embodiments, a significant probability may comprise a probability of at least one percent. In several embodiments, the percentage may be higher than 50 percent and, in further embodiments, the percentage of a significant probability may be more than 90 percent or more than 99 percent.

FIG. 1H illustrates an embodiment of synch logic 1600 such as the synch logic 1034 illustrated in FIG. 1. In some embodiments the synch logic 1600 may receive a first beacon frame from an access point indicating a time slot schedule. The time slot schedule may indicate one or more time slots between beacon frame transmissions. Then the synch logic 1600 may wake from a doze state to an awake state to receive a first synch frame at a boundary of a time slot; receive an indication of receipt of the first synch frame from the physical layer logic; and, in response, initiate access of the channel to transmit a packet to the access point. In several embodiments, the synch logic 1600 may comprise logic to receive a second beacon frame from the access point; wake from the doze state to the awake state to receive another synch frame at a boundary of a time slot; and wait for a packet to synch with the channel after failing to detect the other synch frame.

In some embodiments, the synch logic 1600 may comprise slot selection logic 1605 receive a beacon frame indicating a distribution of station accesses; store a time slot access based upon the distribution of accesses in memory; and wake from the doze state at the time slot access to receive another synch frame. For example, the station may have a collision with another device on the network during a communication between the station and the access point. The access point may determine that there is a significant probability of another collision when the station accesses the channel again so the access point may generate and transmit a distribution of station accesses to devices of the network that includes an indication that the station should access the channel at a particular time slot such as the fifth time slot or may comprise an indication that the station should access the channel during a time slot that is after the first time slot. The slot selection logic 1605 may receive the distribution, determine that the station should access the channel during a time slot other than the first time slot, and store an indication of such in memory. The slot selection logic 1605 may then select the second time slot as a time slot to access the channel during the next beacon interval. And, at the second time slot, the slot selection logic 1605 may wake the station from the doze state to an awake state to receive the synch frame.

Referring again to FIG. 1, the MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1019, 1039 to transmit the frames 1014. The PHY logic 1019, 1039 may generate physical layer protocol data units (PPDUs) based upon the frames like frame 1014. More specifically, the frame builders 1013 and 1033 may generate the frames and data unit builders of the PHY logic 1019, 1039 may encapsulate the frames with preambles to generate PPDUs for transmission via a physical layer device such as the transceivers (RX/TX) 1020 and 1040.

The frame 1014, also referred to as a MAC layer Service Data Unit (MSDU), may comprise a management frame. For example, frame builder 1013 may generate a management frame such as the beacon frame to identify the communications device 1010 as having capabilities such as supported data rates, privacy settings, quality of service support (QoS), power saving features, cross-support, and a service set identification (SSID) of the network to identify the network to the communications device 1030. In some embodiments, every beacon frame or a determined number of beacon frames may comprise a time slot information element and/or station access distribution information element such as the time slot boundaries field 1120 in FIG. 1C and the station access distribution field 1220 in FIG. 1D. In further embodiments, PHY logic 1019 may generate and transmit synch frames at the time slot boundaries in response to instructions from the MAC sublayer logic 1018.

The communications devices 1010, 1030, 1050, and 1055 may each comprise a transceiver such as transceivers 1020 and 1040. Each transceiver 1020, 1040 comprises a radio 1023, 1043 comprising an RF transmitter and an RF receiver. Each RF transmitter impresses digital data onto an RF frequency for transmission of the data by electromagnetic radiation. An RF receiver receives electromagnetic energy at an RF frequency and extracts the digital data therefrom.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system.

In many embodiments, transceivers 1020 and 1040 implement orthogonal frequency-division multiplexing (OFDM). OFDM is a method of encoding digital data on multiple carrier frequencies. OFDM is a frequency-division multiplexing scheme used as a digital multi-carrier modulation method. A large number of closely spaced orthogonal sub-carrier signals are used to carry data. The data is divided into several parallel data streams or channels, one for each sub-carrier. Each sub-carrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. A guard interval may be inserted between symbols such as the short training field (STF) and long training field (LTF) symbols during transmission to avoid inter-symbol interference (ISI), which might result from multi-path distortion. Guard tones also help the signal conform to a spectral mask. The nulling of the direct component (DC) may be used to simplify direct conversion receiver designs.

In some embodiments, the communications device 1010 optionally comprises a Digital Beam Former (DBF) 1022, as indicated by the dashed lines. The DBF 1022 transforms information signals into signals to be applied via the radio 1023, 1043 to elements of an antenna array 1024. The antenna array 1024 is an array of individual, separately excitable antenna elements. The signals applied to the elements of the antenna array 1024 cause the antenna array 1024 to radiate one to four spatial channels. Each spatial channel so formed may carry information to one or more of the communications devices 1030, 1050, and 1055. Similarly, the communications device 1030 comprises a transceiver 1040 to receive and transmit signals from and to the communications device 1010. The transceiver 1040 may comprise an antenna array 1044 and, optionally, a DBF 1042.

Figure 2:
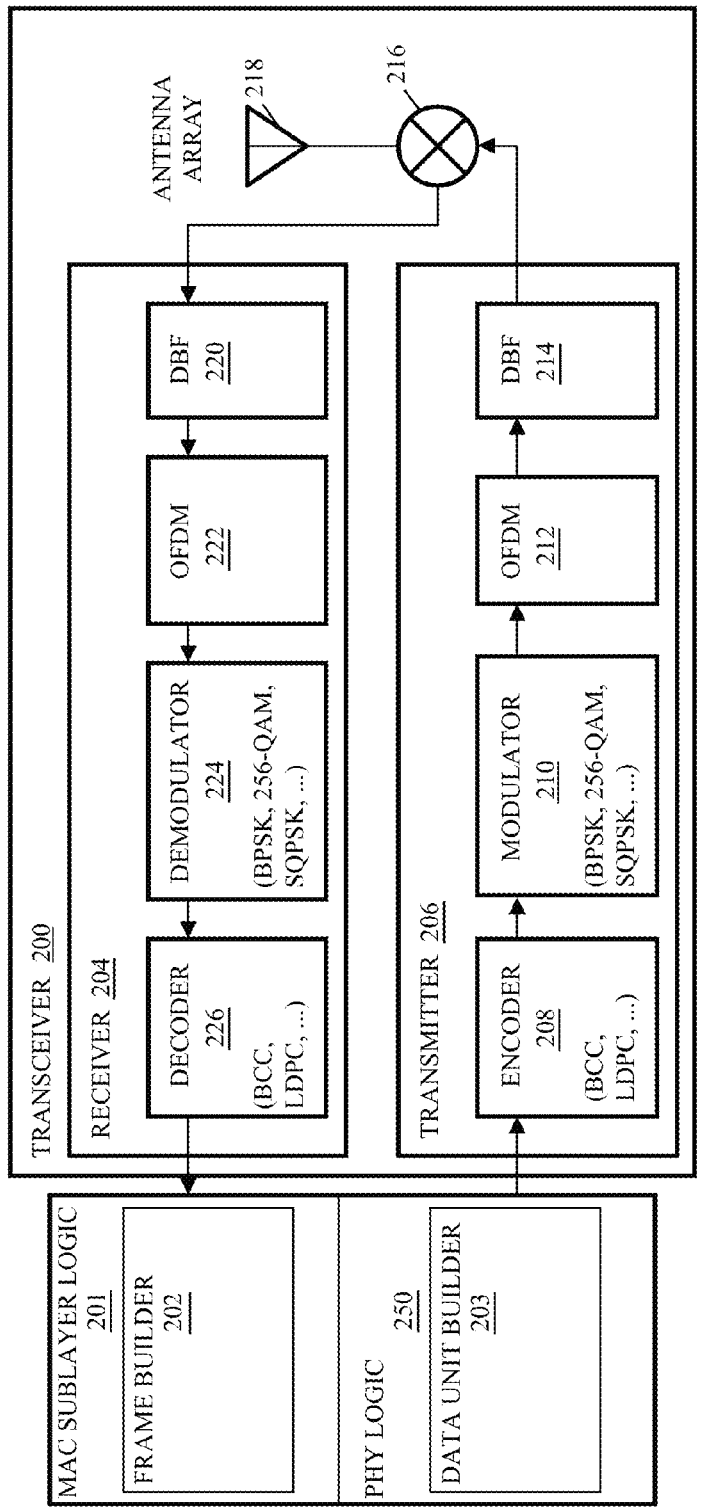
FIG. 2 depicts an embodiment of an apparatus to coordinate communications.

FIG. 2 depicts an embodiment of an apparatus to generate, communicate, transmit, receive, communicate, and interpret a frame. The apparatus comprises a transceiver 200 coupled with medium access control (MAC) sublayer logic 201. The MAC sublayer logic 201 may determine a frame such as a management frame and transmit the frame to the physical layer (PHY) logic 250. The PHY logic 250 may determine the physical layer convergence procedure protocol data unit (PPDU) by determining a preamble and encapsulating the frame with a preamble to transmit via transceiver 200.

In many embodiments, the MAC sublayer logic 201 may comprise a frame builder 202 to generate frames, or MAC protocol data units (MPDUs). The MAC sublayer logic 201 may then receive and parse and interpret a response frame. In many embodiments, the MAC sublayer logic 201 may comprise logic to determine a station access distribution based upon the statistics of the received packets length in time, the type of stations in the network (sensor type devices, cellular offloading devices, or mix of both types), or other information available. The MAC sublayer logic 201 may then generate a management frame such as a beacon frame with the station access distribution and instruct the PHY logic 250 to transmit the management frame.

In other embodiments, the MAC sublayer logic 201 may comprise logic to receive and interpret time slot information and station access distribution information from an AP in a management frame or transmit to the AP the type of station (sensor type device, cellular offloading device, or other type of device), or other information.

The PHY logic 250 may comprise a data unit builder 203. The data unit builder 203 may determine a preamble and the PHY logic 250 may encapsulate the MPDU with the preamble to generate a PPDU. In many embodiments, the data unit builder 203 may create the preamble based upon communications parameters chosen through interaction with a destination communications device.

The transceiver 200 comprises a receiver 204 and a transmitter 206. The transmitter 206 may comprise one or more of an encoder 208, a modulator 210, an OFDM 212, and a DBF 214. The encoder 208 of transmitter 206 receives and encodes data destined for transmission from the MAC sublayer logic 202 with, e.g., a binary convolutional coding (BCC), a low density parity check coding (LDPC), and/or the like. The modulator 210 may receive data from encoder 208 and may impress the received data blocks onto a sinusoid of a selected frequency via, e.g., mapping the data blocks into a corresponding set of discrete amplitudes of the sinusoid, or a set of discrete phases of the sinusoid, or a set of discrete frequency shifts relative to the frequency of the sinusoid. The output of modulator 210 is fed to an orthogonal frequency division multiplexer (OFDM) 212, which impresses the modulated data from modulator 210 onto a plurality of orthogonal sub-carriers. And, the output of the OFDM 212 may be fed to the digital beam former (DBF) 214 to form a plurality of spatial channels and steer each spatial channel independently to maximize the signal power transmitted to and received from each of a plurality of user terminals.

The transceiver 200 may also comprise duplexers 216 connected to antenna array 218. Thus, in this embodiment, a single antenna array is used for both transmission and reception. When transmitting, the signal passes through duplexers 216 and drives the antenna with the up-converted information-bearing signal. During transmission, the duplexers 216 prevent the signals to be transmitted from entering receiver 204. When receiving, information bearing signals received by the antenna array pass through duplexers 216 to deliver the signal from the antenna array to receiver 204. The duplexers 216 then prevent the received signals from entering transmitter 206. Thus, duplexers 216 operate as switches to alternately connect the antenna array elements to the receiver 204 and the transmitter 206.

The antenna array 218 radiates the information bearing signals into a time-varying, spatial distribution of electromagnetic energy that can be received by an antenna of a receiver. The receiver can then extract the information of the received signal.

The transceiver 200 may comprise a receiver 204 for receiving, demodulating, and decoding information bearing signals. The receiver 204 may comprise one or more of a DBF 220, an OFDM 222, a demodulator 224 and a decoder 226. The received signals are fed from antenna elements 218 to a Digital Beam Former (DBF) 220. The DBF 220 transforms N antenna signals into L information signals. The output of the DBF 220 is fed to the OFDM 222. The OFDM 222 extracts signal information from the plurality of sub-carriers onto which information-bearing signals are modulated. The demodulator 224 demodulates the received signal, extracting information content from the received signal to produce an un-demodulated information signal. And, the decoder 226 decodes the received data from the demodulator 224 and transmits the decoded information, the MPDU, to the MAC sublayer logic 201.

After receiving a frame, the MAC sublayer logic 201 may access frame structures in memory to parse the frame. Based upon this information, the MAC sublayer logic 201 may determine contents such as field values in the frame.

Persons of skill in the art will recognize that a transceiver may comprise numerous additional functions not shown in FIG. 2 and that the receiver 204 and transmitter 206 can be distinct devices rather than being packaged as one transceiver. For instance, embodiments of a transceiver may comprise a Dynamic Random Access Memory (DRAM), a reference oscillator, filtering circuitry, synchronization circuitry, an interleaver and a deinterleaver, possibly multiple frequency conversion stages and multiple amplification stages, etc. Further, some of the functions shown in FIG. 2 may be integrated. For example, digital beam forming may be integrated with orthogonal frequency division multiplexing. In some embodiments, for instance, the transceiver 200 may comprise one or more processors and memory including code to perform functions of the transmitter 206 and/or receiver 204.

Figure 3:
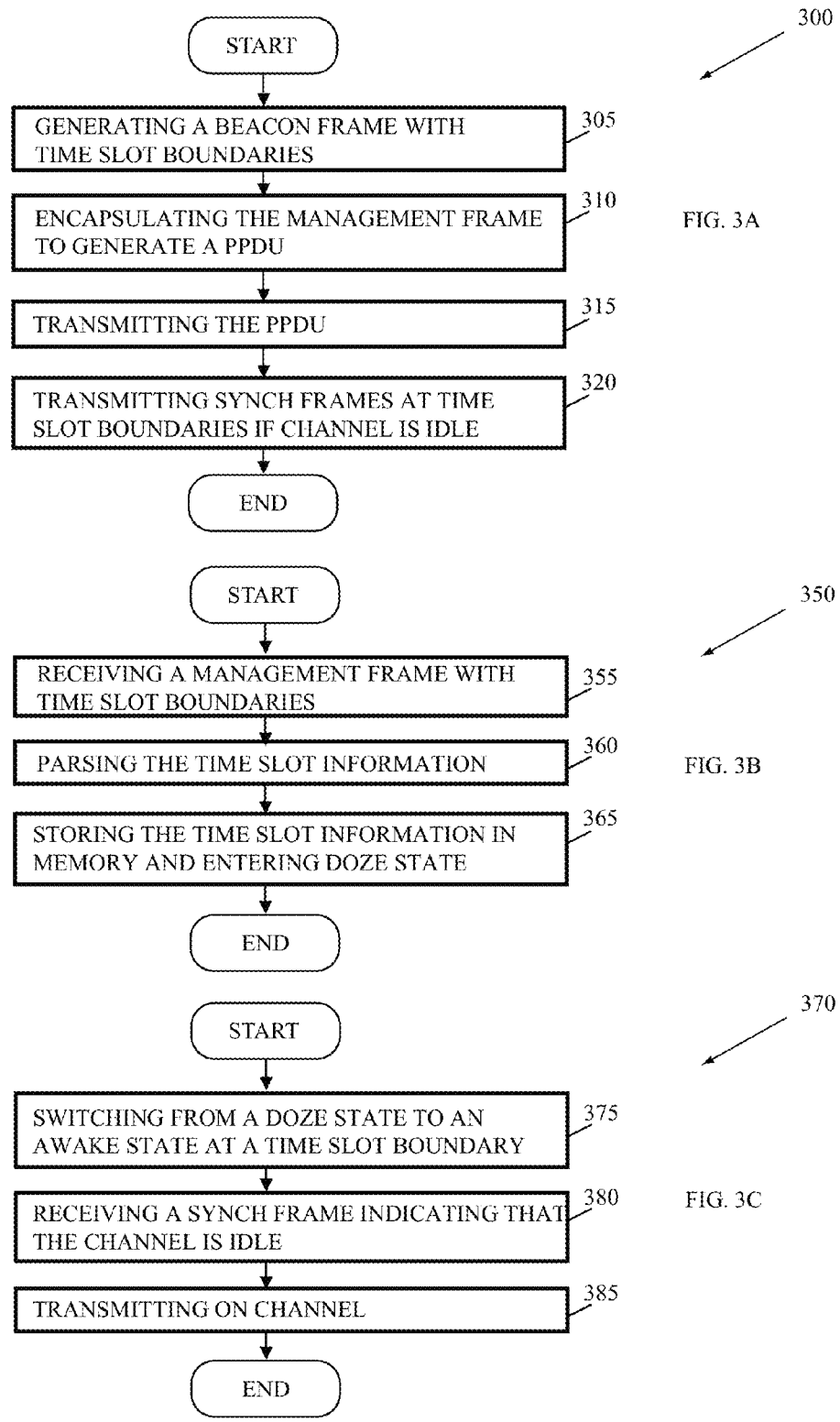
FIG. 3A-C depict embodiments of flowcharts to coordinate communications.

FIGS. 3A-C depict embodiments of flowcharts 300, 350, and 370 to coordinate communications. Referring to FIG. 3A, the flowchart 300 begins with generating a management frame with time slot boundaries information (element 305). In some embodiments, MAC logic such as MAC sublayer logic in an AP may generate a management frame such as a beacon frame to communicate time slot boundaries within beacon intervals to associated stations to provide specific times at which the stations of the BSS may wake from a doze state and transmit a communication to the AP with a minimal latency. In some embodiments, the management frame may also comprise an association frame such as an association response frame or another management frame.

After generating the management frame, the PHY logic may encapsulate the management frame with a preamble to generate a PPDU (element 310). And the PHY may then transmit the PPDU via an antenna or an antenna array (element 315).

After transmitting the beacon frame with the time slot boundaries, the MAC logic may transmit synch frames at the time slot boundaries if the channel is idle (element 320). For instance, the AP may perform a carrier sense multiple access with collision avoidance (CSMA/CA) at a time slot boundary if the AP is not in the process of communicating with another station. If the AP does not detect a communication on the channel, the channel is determined to be idle and MAC logic of the AP may instruct the PHY logic of the AP to transmit a synch frame such as a synch frame with no data payload to the stations in the BSS.

In FIG. 3B, the flowchart 350 begins with receiving a management frame with time slot boundaries information (element 355). In some embodiments, MAC logic of a station may receive the management frame with the time slot boundaries information element and parse and interpret the management frame to determine the time slot boundaries (element 360). In several embodiments, parsing the frame to determine the time slot boundaries comprises parsing a management frame with a time slot boundaries information element and parsing the time slot boundaries information element comprises parsing the time slot boundaries field to determine the time slots within the beacon interval. In some embodiments, parsing the management frame comprises parsing a beacon frame, an association response frame, or a reassociation response frame.

In many embodiments, the station may, in response to receiving a time slot boundaries information in a management frame, store the time slot boundaries for the channel access in memory, select a time slot boundary at which to awake from a doze state, and enter a doze state (element 365). For instance, the upon parsing the time slot boundaries information element to determine the time slot boundaries within the beacon intervals, the station may store the time slot boundaries in memory to facilitate selection of times at which to awake from the doze state.

In FIG. 3C, the flowchart 370 begins with switching from a doze state to an awake state at a time slot boundary (element 375). In some embodiments, MAC logic of a station may wake periodically to transmit data to the access point. The station may wake from the doze state, which may be a low power consumption state, to an awake state at a time slot boundary to facilitate communication with the access point.

Upon entering the awake state and before transmitting the data, the station may receive a synch frame from the AP indicating the channel is idle (element 380). After the clear channel assessment detects the synch frame, the station may transmit a packet on the channel (element 380). For instance, the station may comprise a sensor and may transmit sensor data to the access point.

Figure 4:
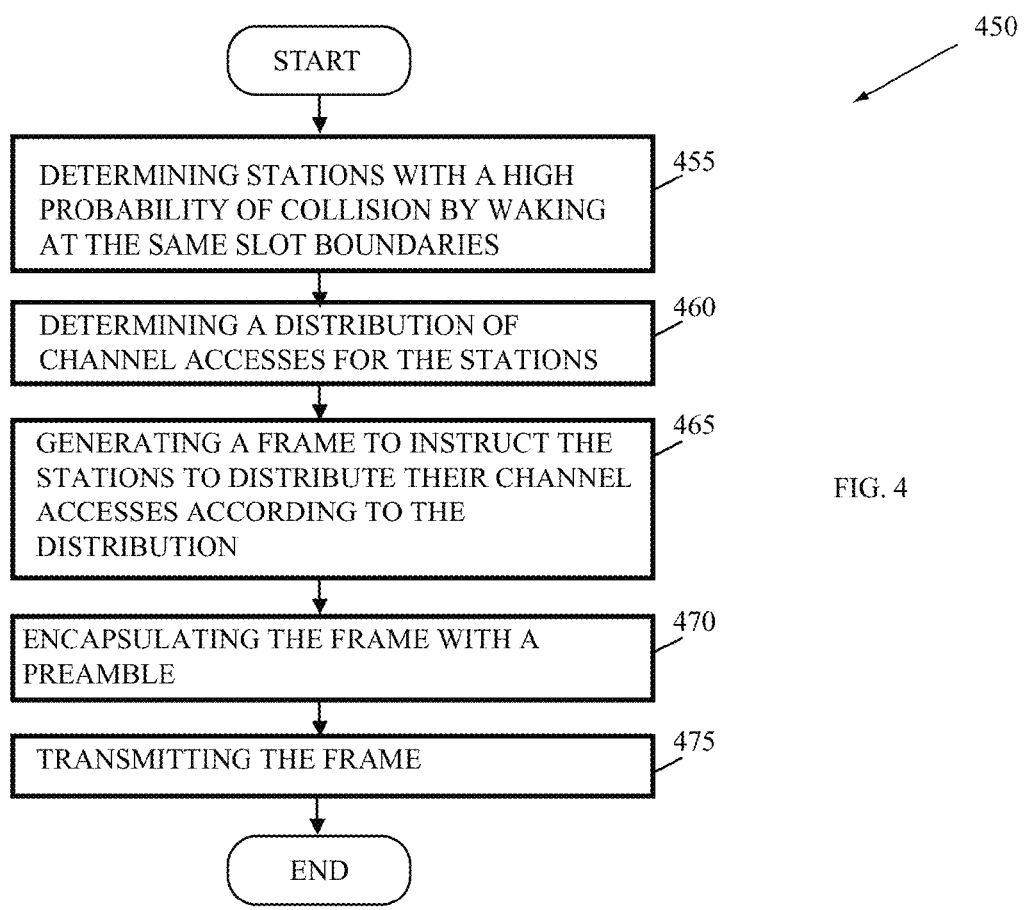
FIG. 4 depicts an embodiment of a flowchart to coordinate communications as illustrated in FIG. 2.

FIG. 4 depicts an embodiment of flowchart 450 to coordinate communications as illustrated in FIG. 2. The flowchart 450 begins with determining stations with a high probability of collision by waking at the same time slot boundaries (element 455). In some embodiments, distribution logic may determine that there is a high probability of collisions based upon one or more of a number of different factors. For instance, over a period of multiple beacon intervals, the AP may determine that a large percentage of stations select the, e.g., first slot boundary as the slot boundary to wake and transmit data to the AP. The larger percentage may be larger with respect to the percentages associated with other time slots in the beacon intervals. And the larger the number of stations that tend to access the channel at the, e.g., first slot boundary, the more significant the probability that two or more of the stations may wake to transmit information at the same time. Furthermore, the stations may wake periodically to transmit the information and if the stations have the same periods of time between accesses and are not causing collisions at the AP, then the probability of collisions may be low. However, if the period of time between the accesses vary from station to station or if some of the stations do not have regular, periodic channel accesses and a larger number of these stations access via same time slot, e.g., the first time slot, the distribution logic may determine that the probability of collision is significant.

After determining stations that have a high probability of collisions, the distribution logic may determine a distribution of station accesses of a channel for the stations (element 460). In some embodiments, the distribution logic may determine particular stations that have a high probability of collisions. In further embodiments, the distribution logic may determine a high probability of collisions based upon traffic with a particular time slot. In still other embodiments, the distribution logic may determine that generally, based upon factors or characteristics associated with the stations in the BSS, there is a high probability that a collision may occur.

In response, the distribution logic may determine a distribution of the station accesses of the channel for the stations that are likely to have collisions or may determine a distribution of the station accesses of the channel for all the stations or at least the majority of the stations. The distribution of the station accesses of the channel amongst time slots may include time slot assignments or more general restrictions such as restricting some stations to the first five time slots and restricting other stations to the second five time slots. In some embodiments, the distribution of the station accesses of the channel may split the stations into a few groups, split the time slots into a few groups, and assign each group of stations to a different group of time slots.

After determining a distribution of the station accesses of the channel, the AP may generate a frame to instruct the stations to distribute their channel accesses according to the distribution (element 465). In many embodiments, the AP may generate a management frame such as a beacon frame with the distribution of the station accesses of the channel or an indication of the distribution and pass the beacon frame to the PHY logic. In some embodiments, the distribution of the station accesses of the channel may be incorporated in a frame body of the management frame along with an indication of the time slot boundary information. In further embodiments, the distribution of the station accesses of the channel may be integrated with the time slot boundary information. For instance, the time slot boundary information may comprise the time frame of the time slot or the start of the time slot and the distribution of the station accesses of the channel may be associated with the time slot boundary information in the same information element or in a corresponding field.

The PHY logic may receive the management frame and encapsulate the frame with a preamble (element 470). After encapsulating the frame, the AP may transmit the frame to the stations associated with the AP (element 475).

The following examples pertain to further embodiments. One example comprises a method. The method may involve determining, by a first communications device, a time slot schedule between beacon frame transmissions; generating, by the first communications device, a first beacon frame indicating the time slot schedule; transmitting, by the first communications device, the first beacon frame; generating, by the first communications device, a first synch frame unless a communications channel is busy; and transmitting, by the first communications device, the synch frame at a slot boundary between beacon frame transmissions unless the communications channel is busy.

In some embodiments, the method may further comprise determining a significant probability of collisions between two or more communications device; determining a distribution of accesses by the two or more communications devices; generating a second beacon frame indicating the distribution of accesses; and transmitting the frame. In some embodiments, determining a significant probability of collisions comprises detecting a collision with a transmission from at least one of the communications devices. In many embodiments, determining the time slot schedule between beacon frame transmissions comprises determining the time slot schedule with time slots, wherein each time slot may be a time duration of at least a duration for a transmission of a physical layer convergence procedure protocol data unit plus a short interframe space. In several embodiments, determining the time slot schedule between beacon frame transmissions comprises dividing the beacon interval into more than one time slots, wherein each time slot may be a time duration of at least a duration for a transmission of a physical layer convergence procedure protocol data unit plus a short interframe space plus a duration for a transmission of an acknowledgement frame. In some embodiments, generating the first synch frame unless a communications channel is busy comprises generating a physical layer frame with six or more orthogonal frequency division multiplexing symbols.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control logic to determine a time slot schedule between beacon frame transmissions and to generate a first beacon frame indicating the time slot schedule; and a physical layer logic coupled with the medium access control logic to generate and transmit a first synch frame unless a communications channel is busy and to encapsulate and transmit the first beacon frame.

In some embodiments, the apparatus may further comprise an antenna to transmit the frame encapsulated by the preamble. In some embodiments, the apparatus may further comprise memory coupled with the medium access control logic to store the time slot schedule. In some embodiments, the medium access control logic comprises logic to determine a significant probability of collisions between two or more communications device; and determine a distribution of accesses by the two or more communications devices; generate a frame indicating the distribution of accesses; and to instruct the physical layer logic transmit the frame. In some embodiments, the medium access control logic comprises logic determine the time slot schedule with time slots, wherein each time slot may be a time duration of at least a duration for a transmission of a physical layer convergence procedure protocol data unit plus a short interframe space plus a duration for a transmission of an acknowledgement frame. In some embodiments, the medium access control logic comprises logic to divide the beacon interval into more than one time slots, wherein each time slot may be a time duration of at least a duration for a transmission of a physical layer convergence procedure protocol data unit plus a short interframe space. And in some embodiments of the apparatus, the physical layer logic comprises logic to generating the synch frame with six or more orthogonal frequency division multiplexing symbols.

Another example comprises a system. The system may comprise a medium access control logic to determine a time slot schedule between beacon frame transmissions and to generate a first beacon frame indicating the time slot schedule; and a physical layer logic coupled with the medium access control logic to generate and transmit a first synch frame unless a communications channel is busy and to encapsulate and transmit the first beacon frame.

Another example comprises a program product. The program product to coordinate transmissions of different types of devices on a wireless network may comprise a storage medium comprising instructions to be executed by a processor-based device, wherein the instructions, when executed by the processor-based device, perform operations, the operations comprising: determining, by a first communications device, a time slot schedule between beacon frame transmissions; generating, by the first communications device, a first beacon frame indicating the time slot schedule; transmitting, by the first communications device, the first beacon frame; generating, by the first communications device, a first synch frame unless a communications channel is busy; and transmitting, by the first communications device, the synch frame at a slot boundary between beacon frame transmissions unless the communications channel is busy.

Another example comprises a method. The method may involve receiving, by a first communications device, a first beacon frame indicating a time slot schedule, wherein the time slot schedule indicates one or more time slots between beacon frame transmissions; waking, by the first communications device, from a doze state to an awake state to receive a first synch frame at a boundary of a time slot; and receiving the first synch frame to synch with a channel; and transmitting a communication to an access point after synching with the channel.

Some embodiments may further comprise receiving a second beacon frame indicating the distribution of accesses; storing a time slot access based upon the distribution of accesses in memory; and waking from the doze state at the time slot access to receive another synch frame. In some embodiments, the method further comprises receiving, by the first communications device, a second beacon frame; waking, by the first communications device, from the doze state to the awake state to receive another synch frame at a boundary of a time slot; and waiting for a packet to synch with the channel after failing to detect the other synch frame. In many embodiments, receiving the first synch frame comprises synching with the channel in response to receiving a physical layer frame with six or more orthogonal frequency division multiplexing symbols. And in many embodiments, transmitting the communication comprises transmitting the communication after an interframe space and a backoff.

At least one computer program product for communication of a packet with a frame, the computer program product comprising a computer useable medium having a computer useable program code embodied therewith, the computer useable program code comprising computer useable program code configured to perform operations, the operations to carry out a method according to any one or more or all of embodiments of the method described above.

At least one system comprising hardware and code may carry out a method according to any one or more or all of embodiments of the method described above.

Another example comprises an apparatus. The apparatus may comprise a medium access control logic to receive a first beacon frame indicating a time slot schedule, wherein the time slot schedule indicates one or more time slots between beacon frame transmissions; wake from a doze state to an awake state to receive a first synch frame at a boundary of a time slot; and a physical layer logic coupled with the medium access control logic to receive the first synch frame to synch with a channel; inform the medium access control logic of receipt of the first synch frame; and transmit a communication to an access point after synching with the channel.

In some embodiments, the apparatus may further comprise an antenna coupled with the physical layer logic to transmit a communication. In some embodiments, the apparatus may further comprise memory coupled with the medium access control logic, the medium access control logic to store an indication of the time slot schedule in the memory. In some embodiments, the medium access control logic comprises logic to receive a second beacon frame indicating the distribution of accesses; store a time slot access based upon the distribution of accesses in memory; and wake from the doze state at the time slot access to receive another synch frame. And in some embodiments, the medium access control logic comprises logic to receive a second beacon frame; wake from the doze state to the awake state to receive another synch frame at a boundary of a time slot; and wait for a packet to synch with the channel after failing to detect the other synch frame delay.

Another example comprises a system. The system may comprise a medium access control logic to receive a first beacon frame indicating a time slot schedule, wherein the time slot schedule indicates one or more time slots between beacon frame transmissions; wake from a doze state to an awake state to receive a first synch frame at a boundary of a time slot; and a physical layer logic coupled with the medium access control logic to receive the first synch frame to synch with a channel; inform the medium access control logic of receipt of the first synch frame; and transmit a communication to an access point after synching with the channel.

Another example comprises a program product. The program product to coordinate transmissions of devices on a wireless network may comprise a storage medium comprising instructions to be executed by a processor-based device, wherein the instructions, when executed by the processor-based device, perform operations, the operations comprising: receiving, by a first communications device, a first beacon frame indicating a time slot schedule, wherein the time slot schedule indicates one or more time slots between beacon frame transmissions; waking, by the first communications device, from a doze state to an awake state to receive a first synch frame at a boundary of a time slot; and receiving the first synch frame to synch with a channel; and transmitting a communication to an access point after synching with the channel.

In some embodiments of the program product, the operations further comprise receiving a second beacon frame indicating the distribution of accesses; storing a time slot access based upon the distribution of accesses in memory; and waking from the doze state at the time slot access to receive another synch frame. And in some embodiments, the operations further comprise receiving, by the first communications device, a second beacon frame; waking, by the first communications device, from the doze state to the awake state to receive another synch frame at a boundary of a time slot; and waiting for a packet to synch with the channel after failing to detect the other synch frame.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch, e-fuse, or the like. Still further features may be selected by a user after via a selectable preference such as a software preference, an e-fuse, or the like.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, a dipswitch, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems, apparatuses, and methods described with reference to FIGS. 1-4. Embodiments can take the form of an entirely hardware embodiment, a software embodiment implemented via general purpose hardware such as one or more processors and memory, or an embodiment containing both specific-purpose hardware and software elements. One embodiment is implemented in software or code, which includes but is not limited to firmware, resident software, microcode, or other types of executable instructions.

Furthermore, embodiments can take the form of a computer program product accessible from a machine-accessible, computer-usable, or computer-readable medium providing program code for use by or in connection with a computer, mobile device, or any other instruction execution system. For the purposes of this description, a machine-accessible, computer-usable, or computer-readable medium is any apparatus or article of manufacture that can contain, store, communicate, propagate, or transport the program for use by or in connection with the instruction execution system or apparatus.

The medium may comprise an electronic, magnetic, optical, electromagnetic, or semiconductor system medium. Examples of a machine-accessible, computer-usable, or computer-readable medium include memory such as volatile memory and non-volatile memory. Memory may comprise, e.g., a semiconductor or solid-state memory like flash memory, magnetic tape, a removable computer diskette, a random access memory (RAM), a read-only memory (ROM), a rigid magnetic disk, and/or an optical disk. Current examples of optical disks include compact disk-read only memory (CD-ROM), compact disk-read/write memory (CD-R/W), digital video disk (DVD)-read only memory (DVD-ROM), DVD-random access memory (DVD-RAM), DVD-Recordable memory (DVD-R), and DVD-read/write memory (DVD-R/W).

An instruction execution system suitable for storing and/or executing program code may comprise at least one processor coupled directly or indirectly to memory through a system bus. The memory may comprise local memory employed during actual execution of the code, bulk storage such as dynamic random access memory (DRAM), and cache memories which provide temporary storage of at least some code in order to reduce the number of times code must be retrieved from bulk storage during execution.

Input/output or I/O devices (including but not limited to keyboards, displays, pointing devices, etc.) can be coupled to the instruction execution system either directly or through intervening I/O controllers. Network adapters may also be coupled to the instruction execution system to enable the instruction execution system to become coupled to other instruction execution systems or remote printers or storage devices through intervening private or public networks. Modem, Bluetooth™, Ethernet, Wi-Fi, and WiDi adapter cards are just a few of the currently available types of network adapters.

What is claimed is:

1. A method to coordinate transmissions of devices on a wireless network, the method comprising:
    determining a time slot schedule between beacon frame transmissions by determining the time slot schedule with time slots, wherein each time slot may be a time duration of at least a duration for transmission of a physical layer convergence procedure protocol data unit plus a short interframe space;
    transmitting, by a first communications device, a beacon in a communication channel, the beacon having the time slot schedule for multiple time slots to be included in a beacon interval;
    transmitting, by the first communications device, a first synch frame at a slot boundary of a first time slot if the communication channel is not busy at the slot boundary; and
    not transmitting, by the first communications device, the first synch frame at the slot boundary of the first time slot if the communication channel is busy at the slot boundary.

2. The method of claim 1, further comprising:
    determining a significant probability of collisions between two or more other communications devices;
    determining a distribution of accesses by the two or more other communications devices;
    generating a second beacon frame indicating the distribution of accesses; and
    transmitting the second beacon frame.

3. The method of claim 2, wherein determining a significant probability of collisions comprises detecting a collision with a transmission from at least one of the other communications devices.

4. The method of claim 1, further comprising determining the time slot schedule between beacon frame transmissions by dividing the beacon interval into more than one time slots, wherein each time slot may be a time duration of at least a duration for transmission of a physical layer convergence procedure protocol data unit plus a short interframe space plus a duration for transmission of an acknowledgement frame.

5. The method of claim 1, wherein transmitting the first synch frame at a slot boundary of a first time slot if the communication channel is not busy at the slot boundary comprises generating a physical layer frame with six or more orthogonal frequency division multiplexing symbols.

6. A first wireless communication device comprising:
at least one processor, memory, a medium access control (MAC) layer logic and
a physical (PHY) layer logic, the first wireless communication device to
determine a time slot schedule between beacon frame transmissions by determination of the time slot schedule with time slots, wherein each time slot may be a time duration of at least a duration for transmission of a physical layer convergence procedure protocol data unit plus a short interframe space;
transmit a beacon in a communication channel, the beacon having the time slot schedule for multiple time slots to be included in a beacon interval;
transmit a first synch frame at a slot boundary of a first time slot if the communication channel is not busy at the slot boundary;
not transmit the first synch frame at the slot boundary of the first time slot if the communication channel is busy at the slot boundary.

7. The apparatus of claim 6, further comprising an antenna to transmit the beacon and the first synch frame, the memory to store the time slot schedule.

8. The apparatus of claim 6, wherein the MAC layer logic comprises logic to determine a significant probability of collisions between two or more other communications devices; determine a distribution of accesses by the two or more other communications devices; generate a frame indicating the distribution of accesses; and to instruct the physical layer logic to transmit the frame.

9. The apparatus of claim 6, wherein the MAC layer logic comprises logic to determine the time slot schedule with time slots, wherein each time slot may be a time duration of at least a duration for transmission of a physical layer convergence procedure protocol data unit plus a short interframe space plus a duration for transmission of an acknowledgement frame.

10. The apparatus of claim 6, wherein the MAC layer logic comprises logic to divide the beacon interval into more than one time slots.

11. The apparatus of claim 6, wherein the PHY layer logic comprises logic to generate the synch frame with six or more orthogonal frequency division multiplexing symbols.

12. A program product to coordinate transmissions of devices on a wireless network, the program product comprising:
a storage medium comprising instructions to be executed by a processor-based device, wherein the instructions, when executed by the processor-based device, perform operations, the operations comprising:
determining the time slot schedule between beacon frame transmissions by determining the time slot schedule with time slots, wherein each time slot may be a time duration of at least a duration for transmission of a physical layer convergence procedure protocol data unit plus a short interframe space;
transmitting, by a first communications device, a beacon in a communication channel, the beacon having a time slot schedule for multiple time slots to be included in a beacon interval;
transmitting, by the first communications device, a first synch frame at a slot boundary of a first time slot if the communication channel is not busy at the slot boundary; and
not transmitting, by the first communications device, the first synch frame at the slot boundary of the first time slot if the communication channel is busy at the slot boundary.

13. The machine accessible product of claim 12, wherein the operations further comprise:
determining a significant probability of collisions between two or more other communications devices;
determining a distribution of accesses by the two or more other communications devices;
generating a second beacon frame indicating the distribution of accesses; and
transmitting the second beacon frame.

14. The machine accessible product of claim 13, wherein determining a significant probability of collisions comprises detecting a collision with a transmission from at least one of the other communications devices.

15. The machine accessible product of claim 12, further comprising determining the time slot schedule between beacon frame transmissions by dividing the beacon interval into more than one time slots, wherein each time slot may be a time duration of at least a duration for transmission of a physical layer convergence procedure protocol data unit plus a short interframe space plus a duration for transmission of an acknowledgement frame.

16. The machine accessible product of claim 12, wherein transmitting the first synch frame at a slot boundary of a first time slot if the communication channel is not busy at the slot boundary comprises generating a physical layer frame with six or more orthogonal frequency division multiplexing symbols.

17. A method to coordinate transmissions of devices on a wireless network, the method comprising:
receiving, by a first communications device from a second communications device, a first beacon frame during a beacon interval indicating a time slot schedule during the beacon interval, wherein each time slot of the time slot schedule may be a time duration of at least a duration for transmission of a physical layer convergence procedure protocol data unit plus a short interframe space;
waking, by the first communications device, from a doze state to an awake state to receive a first synch frame at a boundary of a time slot; and
receiving, from the second communications device, the first synch frame to synch with a channel during the beacon interval; and
transmitting a communication to the second communications device after synching with the channel.

18. The method of claim 17, further comprising
receiving a second beacon frame indicating a distribution of accesses;
storing a time slot access based upon the distribution of accesses in memory; and
waking from the doze state at the time slot access to receive an other synch frame.

19. The method of claim 17, further comprising
receiving, by the first communications device, a second beacon frame;
waking, by the first communications device, from the doze state to the awake state to receive an other synch frame at a boundary of a time slot; and
waiting for a packet to synch with the channel after failing to detect the other synch frame.

20. The method of claim 17, wherein receiving the first synch frame comprises synching with the channel in response to receiving a physical layer frame with six or more orthogonal frequency division multiplexing symbols.

21. An apparatus to coordinate transmissions of devices on a wireless network, the apparatus comprising:
at least one processor;
memory;
a medium access control logic to receive a first beacon frame during a beacon interval indicating a time slot schedule during the beacon interval; wake from a doze state to an awake state to receive a first synch frame, from the second communications device, at a boundary of a time slot; and
a physical layer logic coupled with the medium access control logic to receive, from the second communications device, the first synch frame to synch with a channel during the beacon interval, wherein each time slot of the time slot schedule may be a time duration of at least a duration for transmission of a physical layer convergence procedure protocol data unit plus a short interframe space; inform the medium access control logic of receipt of the first synch frame; and transmit a communication to the second communications device after synching with the channel.

22. The apparatus of claim 21, further comprising an antenna coupled with the physical layer logic to transmit the communication.

23. The apparatus of claim 21, wherein the medium access control logic comprises logic to receive a second beacon frame indicating a distribution of accesses; store a time slot access based upon the distribution of accesses in memory; and wake from the doze state at the time slot access to receive an other synch frame.

24. The apparatus of claim 21, wherein the medium access control logic comprises logic to receive a second beacon frame; wake from the doze state to the awake state to receive an other synch frame at a boundary of a time slot; and wait for a packet to synch with the channel after failing to detect the other synch frame.

25. A program product to coordinate transmissions of devices on a wireless network, the program product comprising:
a storage medium comprising instructions to be executed by a processor-based device, wherein the instructions, when executed by the processor-based device, perform operations, the operations comprising:
receiving, by a first communications device from a second communications device, a first beacon frame during a beacon interval indicating a time slot schedule during the beacon interval, wherein each time slot of the time slot schedule may be a time duration of at least a duration for transmission of a physical layer convergence procedure protocol data unit plus a short interframe space;
waking, by the first communications device, from a doze state to an awake state to receive a first synch frame at a boundary of a time slot; and
receiving, from the second communications device, the first synch frame to synch with a channel during the beacon interval; and
transmitting a communication to the second communications device after synching with the channel.

26. The machine accessible product of claim 25, wherein the operations further comprise:
receiving a second beacon frame indicating a distribution of accesses;
storing a time slot access based upon the distribution of accesses in memory; and
waking from the doze state at the time slot access to receive an other synch frame.

27. The machine accessible product of claim 25, wherein the operations further comprise:
receiving, by the first communications device, a second beacon frame;
waking, by the first communications device, from the doze state to the awake state to receive an other synch frame at a boundary of a time slot; and
waiting for a packet to synch with the channel after failing to detect the other synch frame.

28. The method of claim 1, wherein the slot boundary corresponds to a time for a second wireless communications device to awake from a doze state to receive the synch frame.

29. The first wireless communication device of claim 6, wherein the slot boundary corresponds to a time for a second wireless communications device to awake from a doze state to receive the synch frame.

30. The machine accessible product of claim 12, wherein the slot boundary corresponds to a time for a second wireless communications device to awake from a doze state to receive the synch frame.

* * * * *